Patented Nov. 20, 1923.

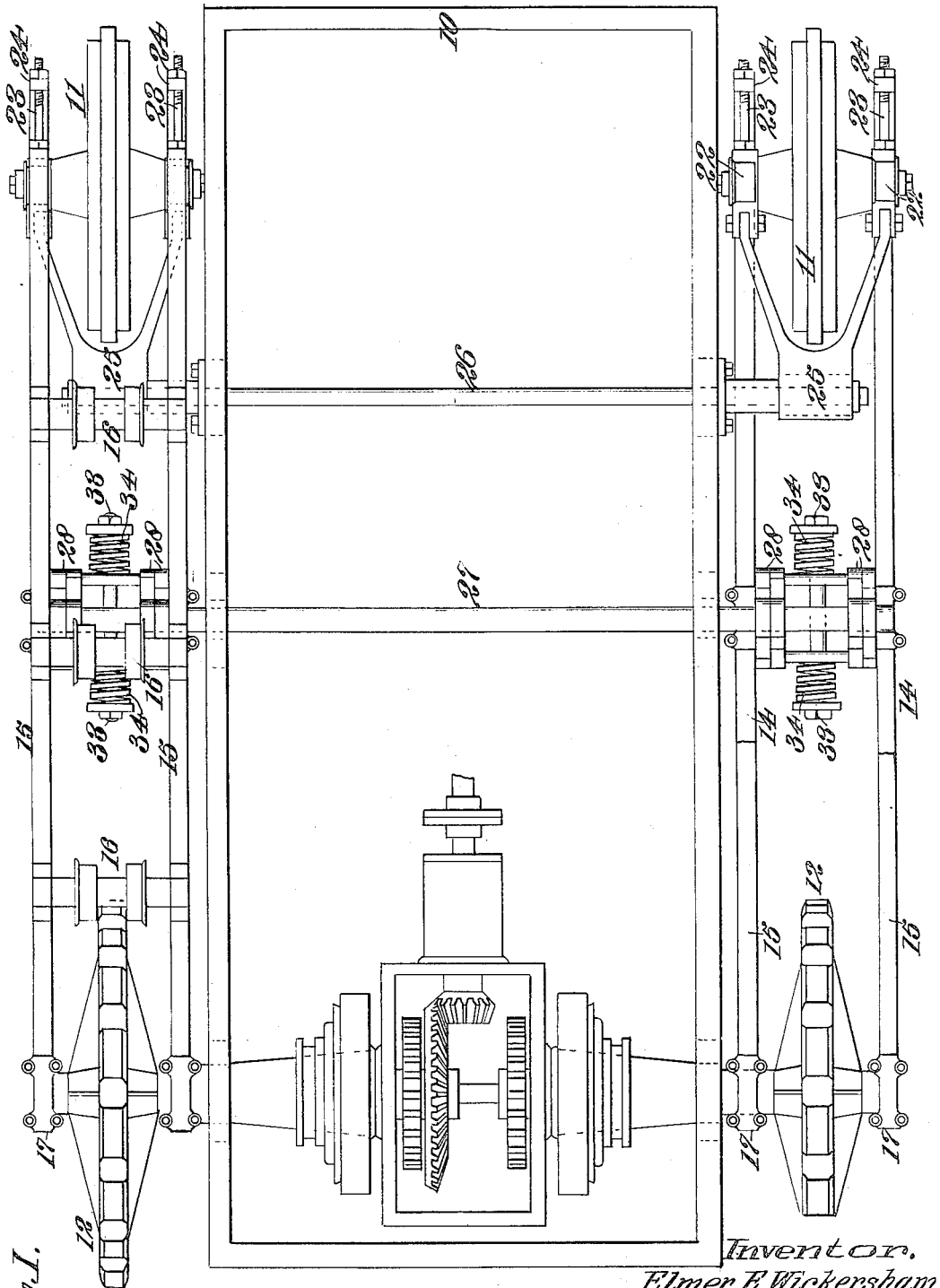

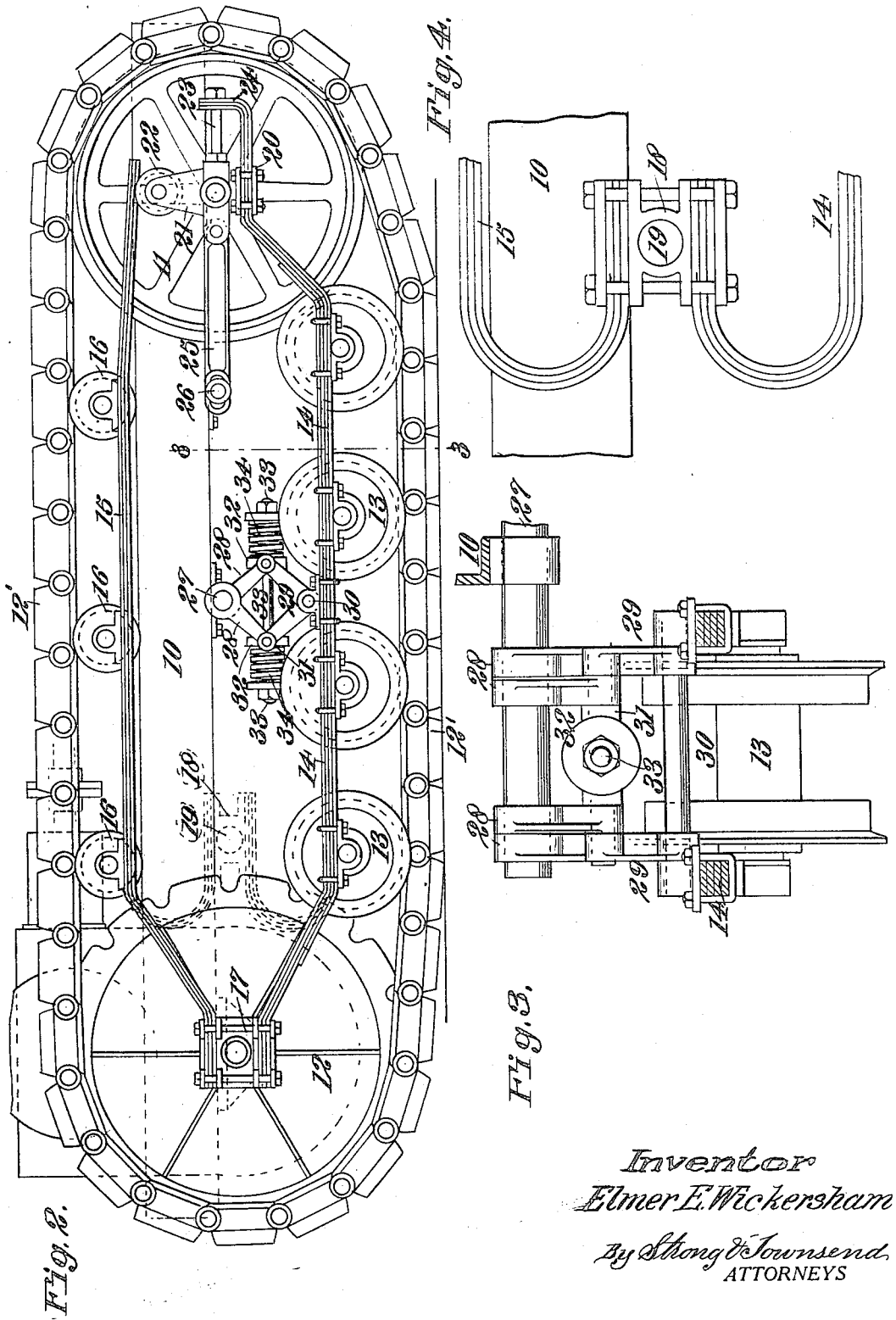

1,474,749

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR FRAME SUSPENSION.

Application filed October 7, 1919. Serial No. 328,961.

*To all whom it may concern:*

Be it known that I, ELMER E. WICKERSHAM, a citizen of the United States, residing at Stockton, in the county of San Joaquin and State of California, have invented new and useful Improvements in Tractor Frame Suspensions, of which the following is a specification.

This invention relates to tractors, and more particularly to the self-laying track truck mechanism and means for suspending the main frame thereon.

The object is to insure complete cushioning of the main frame. The track frames are in themselves resilient and are arranged for independent rocking movement relative to the main frame to allow the trucks to accommodate themselves to inequalities in the ground surface. A novel form of spring support is interposed between each truck and the main frame.

In the accompanying drawings:

Fig. 1 shows a plan view of a tractor embodying my invention.

Fig. 2 shows a side elevation of the same.

Fig. 3 shows a detailed sectional view taken on the line 3—3 of Fig. 2.

Fig. 4 shows a modified arrangement for connecting the track frames to the main frames.

10 indicates the main frame of a tractor or other vehicle at either side of which is arranged a self-laying track truck mechanism. Each truck mechanism includes a front idler wheel 11 on which a flexible track 12′ is carried, toothed sprocket wheel 12 at the rear for driving the track, and a series of rollers 13 arranged between the driving and idler wheels for supporting the truck mechanism upon the track. The frame for the truck mechanism is made up of laterally spaced lower bars 14 formed of laminations of spring metal, between which the load supporting rollers 13 are journaled, laterally spaced upper bars 15 also made up of laminations of spring metal between which are journaled at intervals rollers 16 for supporting the upper run of the track. The upper and lower frame bars extend parallel to a point near the rear where they converge to receive a bearing member 17 in which the support for the driving sprocket wheel is journaled at its outer end, said support being journaled on the main frame at its inner end. As a modification of the arrangement just described, I may curve the rear ends of the two sets of frame bars together as shown in Fig. 4, and also as suggested by the dotted lines in Fig. 2, and connect these two ends together by means of a bearing block 18 journaled on a pivot 19, the latter being secured to the main frame in front of the driving sprocket wheel. In this form the driving sprocket wheel will be supported entirely on the main frame and have no direct connection with the truck frame members.

The lower frame bars 14 at their forward ends are inclined upwardly and receive by means of clips and bolts 20 the bearing members for the front idler wheel. The bracket 21 is formed on each bearing support for the front idler and extends upwardly where the roller 22 is journaled therein, said roller serving as a support for the forward end of the adjacent upper frame member 15. Thus, the forward ends of the upper frame members are free to move back and forth in a manner to permit deflection of the spring bars. The front idler bearings are adjustable fore and aft on the frame bars 14 when the clip bolts are slacked. Stud bolts 23 are fixed on the bearing supports for the front idler and extend forwardly through apertures formed in the up-turned ends 24 of the lower frame bars. By means of nuts placed on the outer ends of the stud bolts and bearing against the upturned ends of the frame bars, the bearings for the front idler wheel are held against rearward movement and also these bolts may be taken advantage of to draw the front idler wheel forwardly when it is desired to adjust the position of the latter for the purpose of tightening the track.

As a means of maintaining parallelism of the trucks, I hinge a yoke 25 to the bearings at each side of the front idler wheel and this yoke extends rearwardly where a transverse rod 26 fixed to the main frame 10 connects opposite yokes together, passing through slots or elongated openings formed in the rear ends of the yokes. These slotted connections are necessary to allow the front ends of the trucks to move up or down relatively to the main frame.

A yielding load supporting connection for the main frame is formed by means of a pair of toggles at each side of the main frame and connected to a transverse shaft or axle 27 fixed to the main frame on a line approximating the center of gravity of the load. Each set of toggles consists of a pair of upper divergent links 28 journaled on the shaft 27 and a pair of lower links 29, both journaled on a pin 30 fixed to the lower truck frame member 14. The upper and lower links are connected together by means of bosses 31 formed on cross-heads 32 which slide on a rod 33 to compress coil springs 34.

With the above described arrangement, each truck is free to rock about its pivotal connection with the main frame to permit it to move upwardly when an obstruction is met with. In so moving upwardly, the toggle links will be spread apart to compress the springs 34 and thus the shock of the upward movement will be cushioned and little or no movement will be imparted to the main frame. It will be noted that the upper and lower members which form the truck frame are in themselves flexible, and therefore each of the rollers 13 will be individually cushioned. Such a construction will allow the chain track to conform more closely to the contour of the ground and also the manner of mounting the front idler wheel on the lower spring member 14 will allow said idler wheel to move rearwardly by bending the spring member when an unyielding obstruction becomes lodged between the track and idler. Without the flexible frame members, breakage of the track would result in such cases.

Having thus described my invention, what I claim and desire to secure by Letters Patent is:

1. In a vehicle of the self-laying track type, a main frame, a truck mechanism comprising longitudinally extending spring members, a fixed pivotal connection between the main frame and one end of the spring members, a load-supporting connection between the main frame and spring members permitting vertical rocking movement and elongation of the spring members with relation to the main frame and load-carrying rollers journaled upon said spring members.

2. In a vehicle of the self-laying track type, a main frame, a truck mechanism comprising a longitudinally extending spring member, a fixed pivotal connection between the main frame and the spring member at one end and a load-supporting connection near the opposite end comprising spring-resisting toggle mechanism permitting vertical rocking movement of the spring member and elongation thereof with relation to the main frame and rollers journaled upon said spring member.

3. In a vehicle, a chain track truck mechanism comprising a frame formed of upper and lower spring metal members, rollers on the upper member to support the chain track, and rollers on the lower member to support the load upon the track, an idler wheel journaled on the forward ends of the lower members, and a support carried by the bearings for the idler wheel on which the upper frame member is freely movable.

4. In a vehicle of the chain track type, a main frame, a truck mechanism comprising a frame having spaced side bars pivotally connected to the main frame for rocking movement in a vertical plane, a guide wheel for the track journaled upon said bars, each of said bars being formed of laminated spring material and rollers journaled directly upon said side bars between the same for supporting the truck upon the track.

5. In a vehicle of the chain track type a truck mechanism comprising a frame having spaced side bars, each formed of laminated spring material, rollers journalled upon said side bars between the same for supporting the truck upon the track, and a sprocket wheel at opposite ends of the side bars to carry the track.

In testimony whereof I have hereunto set my hand in the presence of two subscribing witnesses.

ELMER E. WICKERSHAM.

Witnesses:
DAVID D. LYMAN,
EDWARD E. BRIETENBRECHER.